United States Patent
Lazarus et al.

[11] 3,887,270
[45] June 3, 1975

[54] STYLUS DEVICE FOR THE VISION OF IMAGE SEQUENCES

[76] Inventors: Alfred Lazarus; Jean-Jaques Lazarus, both of 2, Rue Friese, Strasbourg, France, 67000

[22] Filed: Apr. 3, 1974

[21] Appl. No.: 457,612

[30] Foreign Application Priority Data
Apr. 3, 1973  Italy................................. 22521/73

[52] U.S. Cl. .................. 350/241; 350/22; 350/288; 40/334
[51] Int. Cl. .......................................... G02b 27/02
[58] Field of Search ............. 40/334, 335; 352/101; 356/241; 350/288, 292, 241, 238, 22, 21

[56] References Cited
UNITED STATES PATENTS
3,343,292  9/1967  Jorgensen .................... 350/241 UX

*Primary Examiner*—Ronald L. Wibert
*Assistant Examiner*—Paul K. Godwin
*Attorney, Agent, or Firm*—Stewart and Kolasch, Ltd.

[57] ABSTRACT

Stylus device for viewing image sequences, comprising a tubular member, and eye-piece near the end of the tubular member, a plurality of photographic images arranged like a ring within the tubular member and a 45° mirror shaped substantially as an isosceles trapezoid located within the tubular member near the photographic images. The tubular member is translucid and rotatable with respect to the mirror.

1 Claim, 3 Drawing Figures

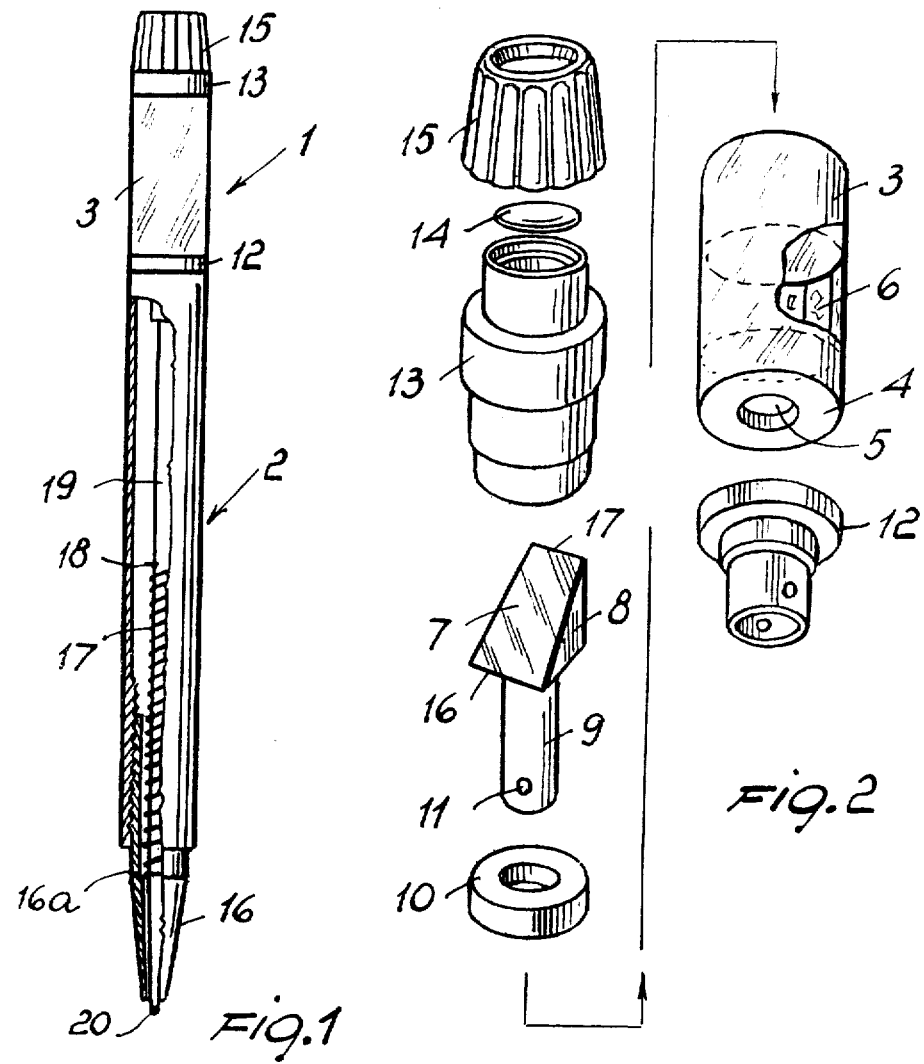
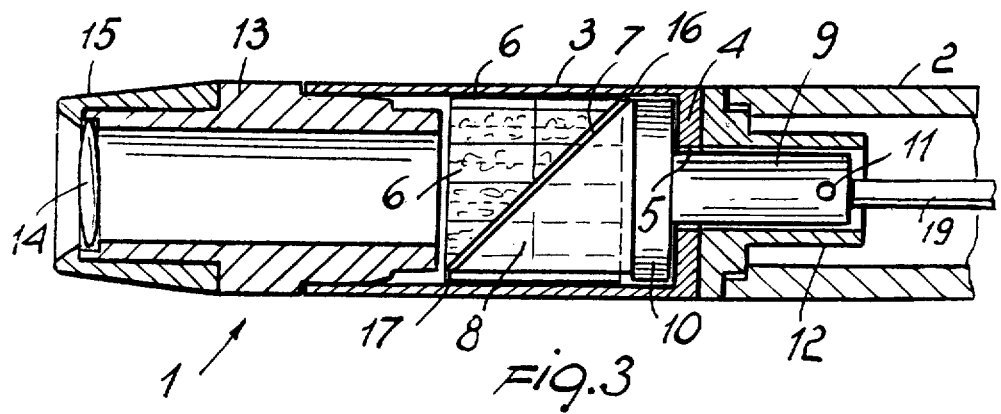

STYLUS DEVICE FOR THE VISION OF IMAGE SEQUENCES

This invention relates to a stylus device for viewing image sequences.

Viewers associated for example with the end of a pen are already available, consisting of an eyepiece, a 45° mirror and a plurality of images disposed along one or more circumferences inside the device. By rotating the support for these images (generally they are photographs of very small dimensions), they become disposed in a position corresponding with the reflecting mirror. An aperture formed in the casing of the device, aligned with this mirror, exactly bounds the field of vision and allows light to reach the image thus positioned.

Viewers which satisfy this general principle consequently imply considerable manufacturing precision and hence relatively high production costs.

The main object of the present invention is to provide a device for viewing successive images which, contrary to other already known types, can be constructed at a substantial cost reduction because of the simplification of assembly and the smaller number and more simple structure of the individual component parts.

These objects and others which will be more evident hereinafter are attained by a stylus device for viewing image sequences, comprising a cylindrical sleeve, an eyepiece associated with one end of said sleeve, a plurality of photographic images disposed as a ring on the inner wall of said sleeve, and a 45° mirror situated in said sleeve in a position corresponding with said images, in which said sleeve is constructed of translucent material for the through illumination of the images over its entire extension, along which said plurality of images is disposed, said mirror having a surface shaped substantially as an isosceles trapesium with its minor base adjacent to, and its major base remote from the eyepiece, the surface of said mirror being dimensioned in such a manner as to subtend an image or a whole number of said images, the sleeve being rotatable with respect of said mirror, which is kept at rest with respect to the observer.

Further characteristics and advantages will be more evident from the detaileld description of a preferred but not exclusive embodiment of a viewing device for images according to the invention illustrated by way of non-limiting example in the accompanying drawing in which:

FIG. 1 is a partly sectional overall view of a stylus device according to the invention;

FIG. 2 is an exploded perspective view of the various elements constituting the actual viewer device;

FIG. 3 is an axial section through the said device.

The viewer according to the invention consists of an assembly indicated overall by the reference numeral 1 (the components of which are shown in FIG. 2) associated with a support which in the embodiment shown is imagined in the form of a pen 2.

The actual viewer is formed from a cylindrical sleeve 3 of translucent material, closed at its bottom by a surface 4 provided in its centre with a hole 5. Along the inner surface of the sleeve 3 (which as stated is entirely translucent) is fixed a ring of images 6, consisting of a plurality of transparently visible frames which succeed each other along the outline of the sleeve.

These images may be divided in their turn into halves or quarters.

In the sleeve 3 is disposed a 45° mirror 7, mounted on a support 8 provided with a cylindrical appendix 9 which emerges through the passage 5. Between the bottom 4 and body 8 is interposed a ring 10 mounted freely rotatably on the appendix 9. The end of the appendix 9 is traversed by a hole 11 through which a peg is inserted which fixes the appendix 9 (and hence the mirror) to a second sleeve 12 inserted by force into the upper end of the stylus support 2.

By means of this coupling arrangement, the sleeve 3 can be freely rotated around its own axis, while the mirror 7 rigid with the stylus 2 is kept at rest.

The viewer is completed by a further shaped sleeve 13, inserted by force into the translucent sleeve 3, and comprising a ledge at its opposite end against which a lens 14 is located. Said lens is kept in position by a knurled ring 15 forcibly mounted on the end of the element 13.

The mirror 7 has a characteristic isosceles trapezoid conformation in which the major base 16 is more distant from the lens (eyepiece) 14 and the minor base 7 is closer to said eyepiece. Furthermore the surface of the mirror 7 is dimensioned in such a manner that when the images reflected at 45° by the mirror are observed, said mirror frames a single image (or if preferred a whole number of images).

Because of the particular dimensioning of the surface of the mirror 7 and its trapezoidal design, the observer observing through the lens 14 sees an image reflected which corresponds exactly to one frame (or to a multiple of it), the frame presenting no framing defects but instead appearing perfectly rectangular.

The observer can consequently observe the successive images by holding the stylus 2 at rest (and hence the mirror 7) and rotating the assembly 3-13-15. In this manner the various images are brought into succession in front of the mirror 7, and the light diffused through the surface of the sleeve 3 enables an image perfectly framed and free from deformation to be seen at any moment.

This effect, as stated at the beginning, is obtained without using auxiliary components for defining an aperture constituting the only passage of light and surrounding the image, as in traditional designs. With regard to the stylus 2, this is of the retractable point type. For this purpose the pen is provided with a terminal or tip portion 16 screwed into the stylus 2. A spring 17 is interposed between a lodge 16a in the element 16 and an abutment 18 on the refill. On screwing the tip 16, the spring firstly thrusts the refill 19 upwards until it stops against the element 12. From then onwards the further screwing of the tip 16 uncovers the point 20 of the refill. Conversely, on unscrewing the tip 16, it firstly causes the point 20 to retract into it, and further unscrewing causes expansion of the spring. The invention so conceived is susceptible to numerous modifications all of which fall within the scope of the inventive idea. Furthermore all details may be replaced by others technically equivalent.

In practice the materials used and the dimensions may be chosen at will according to requirements.

What we claim is:

1. Stylus device for viewing image sequences, comprising a cylindrical sleeve, an eyepiece situated in the proximity of one end of said sleeve, a plurality of photographic images disposed as a ring on the inner wall of said sleeve, and a 45° mirror situated in said sleeve in a position corresponding with said images, in which said sleeve is constructed of translucent material for the through illumination of the images over its entire extension along which said plurality of images is disposed, said mirror having a surface shaped substantially as an isosceles trapezoid with its minor base adjacent to, and its major base remote from the eyepiece, the surface of said mirror being dimensioned in such a manner as to subtend an image or a whole number of images, said sleeve being rotatable with respect to said mirror, which is kept at rest with respect to the observer.

* * * * *